United States Patent [19]
Lo et al.

[11] Patent Number: 5,801,811
[45] Date of Patent: *Sep. 1, 1998

[54] 3D PHOTOGRAPHIC PRINTER USING A MATRIX DISPLAY FOR EXPOSURE

[75] Inventors: Allen K Wah Lo, Dunwoody, Ga.; Kenneth Quochuy Lao, Westfield, N.J.

[73] Assignee: Image Technology International, Inc., Norcross, Ga.

[*] Notice: The term of this patent shall not extend beyond the expiration date of Pat. No. 5,625,435.

[21] Appl. No.: 682,106

[22] Filed: Jul. 17, 1996

Related U.S. Application Data

[63] Continuation-in-part of Ser. No. 349,481, Dec. 2, 1994, Pat. No. 5,625,435, Ser. No. 602,663, Feb. 16, 1996, abandoned, and Ser. No. 418,016, Apr. 6, 1995, Pat. No. 5,572,633, which is a continuation-in-part of Ser. No. 333,201, Nov. 2, 1994, Pat. No. 5,583,971, which is a continuation-in-part of Ser. No. 1,025, Jan. 9, 1993, abandoned, said Ser. No. 349,481, is a continuation-in-part of Ser. No. 140,681, Oct. 21, 1993, abandoned, which is a continuation-in-part of Ser. No. 602,663, which is a continuation-in-part of Ser. No. 333,201.

[51] Int. Cl.[6] .................................................. G03B 27/32
[52] U.S. Cl. ........................................... 355/22; 355/33
[58] Field of Search .............................. 349/2, 4, 5, 7, 349/15; 353/7; 359/463, 468, 470, 475, 458; 396/329, 330, 333; 348/46, 50, 51, 54, 55; 355/22, 33, 34

[56] References Cited

U.S. PATENT DOCUMENTS

| | | | |
|---|---|---|---|
| 4,896,210 | 1/1990 | Brokenshire et al. | 358/88 |
| 4,903,069 | 2/1990 | Lam | 355/22 |
| 5,019,855 | 5/1991 | Lam | 355/22 |
| 5,028,950 | 7/1991 | Fritsch | 355/22 |
| 5,278,608 | 1/1994 | Taylor et al. | 355/22 |
| 5,408,294 | 4/1995 | Lam | 355/22 |
| 5,455,689 | 10/1995 | Taylor et al. | 358/450 |
| 5,467,204 | 11/1995 | Hatano et al. | 358/482 |
| 5,519,794 | 5/1996 | Sandor et al. | 382/285 |
| 5,528,420 | 6/1996 | Momochi | 359/463 |
| 5,539,487 | 7/1996 | Taguchi et al. | 354/115 |
| 5,624,172 | 4/1997 | Yamagishi | 353/98 |

*Primary Examiner*—Eddie C. Lee
*Assistant Examiner*—John Chizmar
*Attorney, Agent, or Firm*—Deveau, Colton & Marquis

[57] ABSTRACT

The filmless method and printer for making 3D and animation pictures, using a matrix display to sequentially display a series of 2D views, and a projection lens to project the displayed images onto a lenticular print material, each at a different projection angle. In order to fill the image area underlying each lenticule on the lenticular print material with different 2D views, each 2D view must be projected onto the lenticular print material at different projection angle. Two methods can be used: 1) In the scanning method, two of the three elements including the matrix display, the projection lens and the lenticular print material are moved by mechanical means to different positions to change the projection angle; 2) In the non-scanning method, a large-aperture projection lens is used to project the 2D views sequentially displayed on the matrix display onto the lenticular print material such that each 2D view is projected through a different section the lens aperture. The 2D images for making 3D pictures are electronically aligned before they are conveyed to the display. Thus, the key-subject alignment process during printing is eliminated. The matrix display can be a video monitor or a light valve, such as an LCD or LED panel. Computer generated images can be used.

23 Claims, 6 Drawing Sheets

3D PHOTOGRAPHIC PRINTER USING A MATRIX DISPLAY FOR EXPOSURE

The current application is a Continuation-In-Part application of application Ser. No. 08/602,663, filed Feb. 16, 1996, now abandoned, and of application Ser. No. 08/418,016, filed Apr. 6, 1995, now U.S. Pat. No. 5,572,633, each of which is a Continuation-In-Part application of application Ser. No. 08/333,201, filed Nov. 2, 1994, now U.S. Pat. No. 5,583,975, which, in turn, is a Continuation-In-Part application of Ser. No. 08/001,025, filed Jan. 9, 1993, now abandoned. The current application is also a Continuation-In-Part application of application Ser. No. 08/349,481, filed Dec. 2, 1994, now U.S. Pat. No. 5,625,435, which, in turn, is a Continuation-In-Part application of Ser. No. 08/140,681, filed Oct. 21, 1993, which is now abandoned.

PRIOR ART

Lenticular 3D pictures are composed of a series of 2D views of a scene taken at different viewing angles. During printing, it is essential that all the 2D views are aligned in reference to a common point known as the key-subject in the scene. When using the 2D views recorded on film for printing, one must use complicated mechanical means to reposition each of the 2D views before exposing the image onto the lenticular print material. U.S. Pat. No. 4,120,562 (Lo et al.) discloses a single-stage printer for producing 3D pictures from 2D views recorded on film, wherein an optical assembly is used to locate the key subject in each of the 2D views and a precision mechanical assembly is used to move the film to align the key subject. U.S. Pat. No. 5,028,950 (Fristch) discloses a dual-stage printer for producing 3D pictures from 2D views recorded on film, wherein an equally complex optical/mechanical assembly is used to align all the 2D views for exposure.

It is desirable to provide a 3D printer in which the key subject in each view is aligned with another either at the time the 2D views are acquired, or after they are digitized and stored in a computer workstation. By doing so, the optical and mechanical means for locating the key subject and repositioning the film during printing are eliminated.

SUMMARY OF THE INVENTION

The filmless method and printer for making 3D pictures, according to the present invention, use a matrix-type display, such as a video monitor, LCD or LED panel, to sequentially display a series of 2D views; a light source to illuminate the matrix display; and a projection lens to sequentially project the displayed images onto a lenticular print material each at a different projection angle. The matrix display is preferably electrically connected to a computer workstation which stores the 2D views in digital form and conveys them to the display for displaying. The workstation also controls the movement of various electromechanical components of the printer and the printing sequences of the printer. It is understood that the 2D view displayed on the display can be a positive image or a negative image depending upon the optical characteristics of the lenticular print material. The displayed images are reversed (mirror) images.

The matrix-type display can be a video monitor or a light-valve such as a liquid crystal display (LCD) or a light-emitting diode (LED) panel. Other types of matrix light-valves, which are capable of displaying an image on command can also be used.

The matrix-type display can be color or black-and-white (B/W). Preferably a plurality of color filters can be used to adjust the color content of the light output of the matrix display, directly or indirectly.

The LCD panel can be an active-matrix module, operated in a transmissive or reflective mode. Preferably, the light source comprises one or more halogen lamps and a plurality of color filters to adjust the color content of the light output are used.

When a B/W Matrix display is used to display the 2D views for exposure, each 2D view is electronically separated into three color components in RGB (red, green, blue) or CMY (cyan, magenta, yellow), and each color component is sequentially displayed for exposure. A filter wheel containing three matching color filters (RGB or CMY) is disposed about the projection lens to provide a color filter in the projection optical path so that each color component image is exposed through a corresponding filter. Preferably, the color and density of the 3D picture is controlled by the display time for each color component image on the display. A shutter can also be used to control the exposure time and to keep unwanted light away from the print material.

A color display can be used for exposure in a number of ways including: 1) Each 2D view being separated into color components and each color component separately exposed, with or without using color filters, and 2) Each 2D view being exposed as a color image, with or without using a common filter pack.

In order to fill the image area underlying each lenticule on the lenticular print material with different 2D views, each 2D view must be projected onto the lenticular print material at a different projection angle. Two methods can be used to change the projection angle: a scanning method and a non-scanning method. The scanning method has been disclosed in the pending application Ser. No. 08/602,663, filed Feb. 16, 1996, and its parent application Ser. No. 08/333,201, filed Nov. 2, 1994. In the scanning method, at least two of the three elements including the display, the projection lens and the lenticular print material are moved by mechanical means to different positions to change the projection angle. The moving direction is perpendicular to the longitudinal axis of the lenticules on the print material. The non-scanning method has been disclosed in the pending application Ser. No. 08/349,481, filed Dec. 2, 1994. In the non-scanning method, a large-aperture projection lens is used to project the images sequentially displayed on the display onto the lenticular print material. The relative positions between the large-aperture projection lens, the display and the print material are fixed during the entire printing process. In order to change the projection angle, each of the 2D views displayed on the display is projected through a different section of the projection lens aperture.

The image data to be displayed on a display for exposure can be conveyed from an electronic camera or from a computer workstation. It is advantageous that the camera aims at a fixed point (the key subject) in the scene while acquiring the 2D views of the scene at different viewing angles. For example, the camera can be mounted on a circular track for movement while it is focused on a fixed point of the scene located at center of the track's curvature. By doing so, all the 2D views to be displayed on the display are automatically aligned. Thus, the key-subject alignment process during printing is avoided. When the image data for printing are conveyed from a computer workstation, key-subject alignment can be easily performed electronically by shifting the entire images so that the pixel coordinates of the key-subject in each 2D view is the same. For example, a pattern matching algorithm can be used to find out the shift of key subject between 2D views, as described in the following:

1. Choose one of the 2D views, say View 1, for reference.
2. From View 1, select an image area around the key subject as a template. Assuming that the key subject in View 1 is located at the pixel coordinates (x,y), and the template is chosen so that it is bounded by pixels (x−a,y−b), (x+a, y−b), (x+a,y+b) and (x−a, y+b). Preferably a=b and a,b, range from 5 to 100 pixels or more depending on the image size and pixel resolution.
3. From another 2D view, say view 2, select a search area bounded by pixels (x−c,y−d), (x+c,y−d),(x+c,y+d), and (x−c,y+d), where c>a, d>b. Preferably c=d and (c−a), (d−b) range from 5 to 100 pixels or more to ensure that the key subject in view 2 is located within the search area.
4. Electronically move the template within the search area to find a match in the image by computing a series of correlation coefficients, S(m,n), where $$S(m,n) = \sum_i \sum_j \{B1(i,j) - B2(i+m, j+n)\}^2$$

where (x−a)≦i≦(x+a), (y−b)≦j≦(y+b); (a−c)≦m≦(c−a); (b−d)≦n≦(d−b).
In the above equation, B1(p,q) is the pixel intensity of pixel (p,q) in View 1, and the B2(r,s) is the pixel intensity of pixel (r,s) in View 2.

5. From the computed values of S(m,n), find the minimum value of S. If the minimum value of S occurs when m=u, n=v, then the key-subject in View 2 is located at pixel coordinates (x+u,y+v). The entire View 2 should be shifted by u pixels in the −X direction and v in the −Y direction to align with View 1.
6. Repeat Step 3 to Step 5 for all other 2D views.

With this electronic image shifting, the filmless printing method using a matrix display for exposure eliminates the complicated key-subject alignment process as required in the 3D printer where 2D views are recorded on film.

The filmless printing method, according to the present invention, can be used for producing 3D pictures and animation pictures, on a print material where the photosensitive emulsion is precoated or attached to the lenticular screen. It is understood that a lenticular screen comprises a contiguous array of cylindrical lenses having a common longitudinal axis, a common width and an identical total viewing angle defined by the lenticule width and the screen thickness. These cylindrical lenses are known as lenticules.

It is an objective of the present invention to provide a method of printing lenticular pictures from a plurality of 2D views without using photographic film to record 2D views.

It is another objective of the present invention to provide a 3D printing method wherein the key-subject alignment between 2D views can be achieved at the time of acquiring the 2D views or performed electronically in a computer workstation so as to eliminate the key subject alignment process during printing.

It is a further objective of the present invention to provide a 3D printing method capable of making 3D pictures while the 2D views are acquired.

These and other objectives of the present invention will become apparent upon reading the detailed descriptions of the invention.

DETAILED DESCRIPTION OF THE INVENTION

Figure 1:
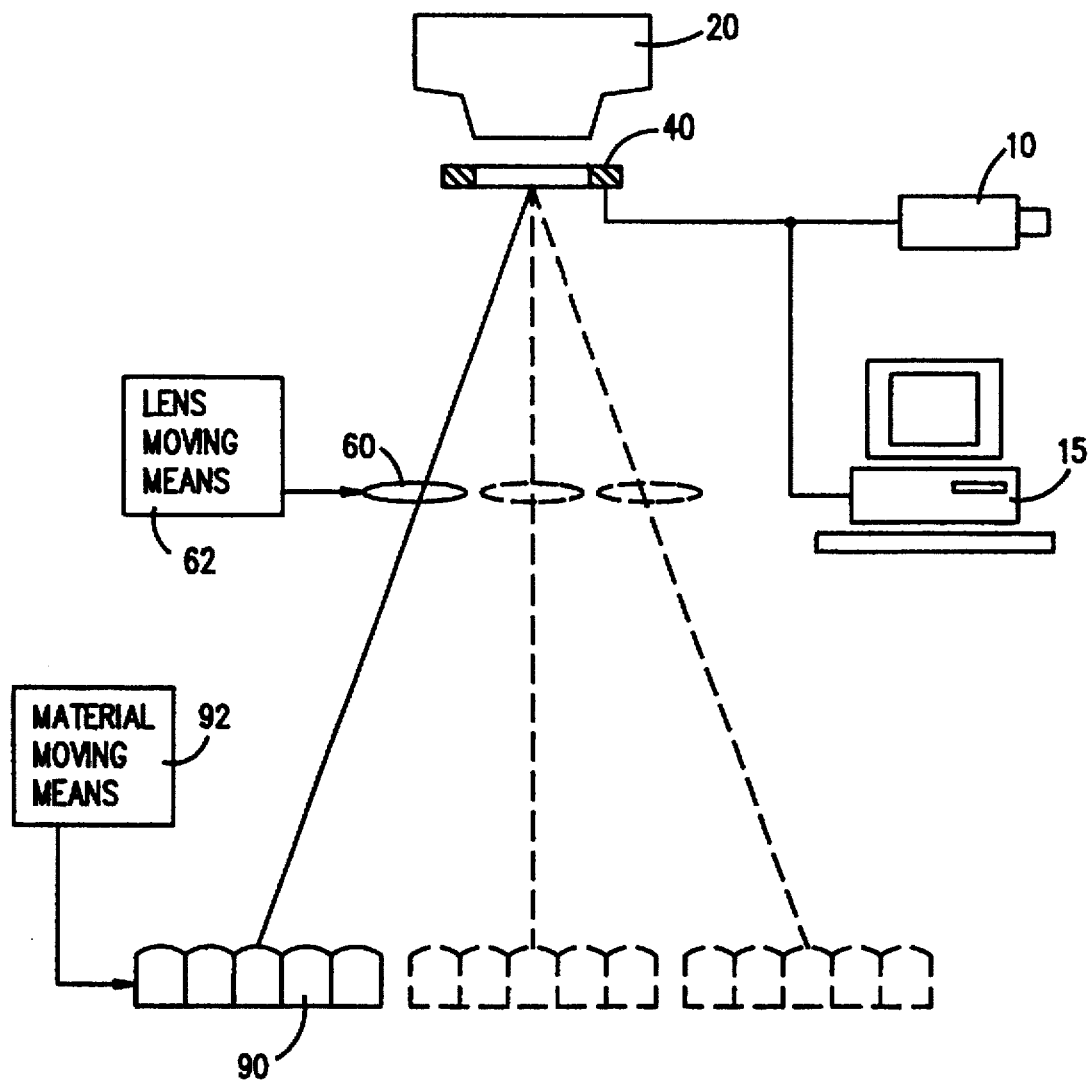
FIG. 1 illustrates the filmless method for printing lenticular pictures composed from a plurality of 2D views in a scanning printer.

FIG. 1 illustrates the filmless method for printing lenticular pictures composed from a plurality of 2D views in a scanning printer, according to the present invention. In FIG. 1, numeral 40 denotes a matrix-type light-valve panel such as an LCD panel used for sequentially displaying a series of 2D views for exposure. The LCD panel 40 is electrically connected to an electronic camera 10 which acquires the 2D views of a scene at different viewing angles. Preferably, the camera 10 is aimed at a fixed point (the key subject) in the scene while acquiring the 2D views so that the images of the 2D views displayed on the LCD panel are automatically aligned. The LCD panel 40 can also be connected to computer workstation 15 which receives and stores 2D views in digital form and conveys 2D views to the LCD for exposure. The computer workstation 15 can be used to electronically align the 2D views in reference to the key subject, if necessary, before conveying the 2D views to the LCD panel. The computer workstation 15 is also used to control the movement of various components in the printer. The LCD panel 40 can be a black-and-white (B/W) panel or a color panel, which is illuminated by a lamphouse 20.

Any type of matrix display can be used to print lenticular print material using the teachings of this invention. The matrix display can be a video monitor, or light-valve such as an LCD panel, or an LED panel.

Numeral 60 denotes a projection lens used for projecting each of the 2D views displayed on the LCD panel onto a lenticular print material 90 at a different projection angle. The print material is disposed in the image plane of the projection lens 60. In order to change the projection angle, the projection lens 60 and the print material 90 are moved to different positions, relative to the LCD panel 40, by lens moving means 62 and material moving means 92. It is understood that the LCD panel 40 can also be moved to change the projection angles.

Figure 2:
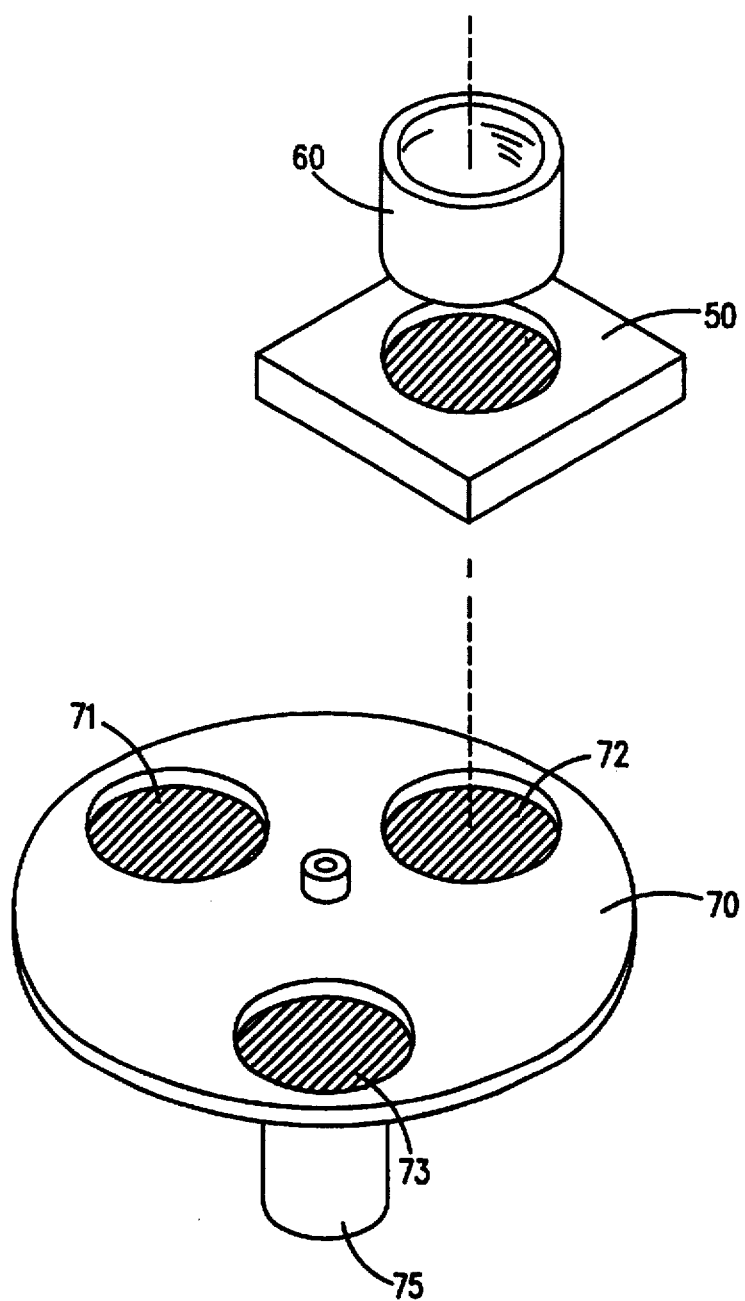
FIG. 2 illustrates a filter wheel for color filtration.

FIG. 2 illustrates a filter wheel for color filtration. When a B/W display is used for exposure, each 2D view is electronically separated into three color components in RGB or CMY and each color component is sequentially displayed on the display. At the same time, a corresponding color filter is used to provide the proper color filtration. As shown in FIG. 2, a filter wheel 70 containing three color filters 71, 72 and 73 in RGB or CMY is disposed in front or behind the projection lens 60. The filter wheel 70 is turned by rotating means 75 to provide a matching color filter for filtering the image of a color component. Preferably, a shutter 50 is used to control the exposure and to prevent unwanted light from reaching the lenticular print material.

Figure 3:
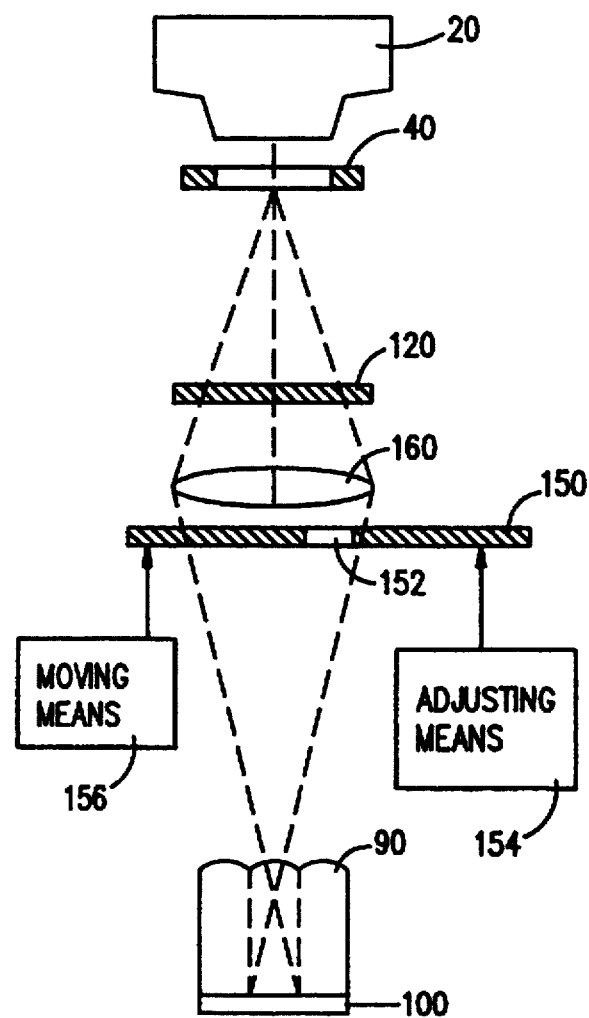
FIG. 3 illustrates the filmless method for printing lenticular pictures composed from a plurality of 2D views in a non-scanning printer.

FIG. 3 illustrates the filmless method of printing lenticular pictures composed from a plurality of 2D views in a non-scanning printer, according to the present invention. In FIG. 3, numeral 160 denotes a large-aperture lens being used to project the 2D images sequentially displayed on a LCD panel 40 onto a lenticular print material 90. The aperture of the projection lens 160 must be sufficiently large to cover the total viewing angle E) of the lenticules on lenticular screen 90 which is disposed in the image plane of the projection lens 160. The relative positions between the LCD panel 40, the projection lens 160 and the print material 90 are fixed during the entire printing cycle. To make a lenticular picture from a plurality of 2D views, the projection lens 160 projects each 2D view through a different section of the lens aperture. For example, when a lenticular picture is composed from N 2D views, the aperture of the projection lens 160 is effectively partitioned into N sections, where N ranges from 2 to 100 or more. As shown in FIG. 3, an aperture plate 150 having an opening 152 is used for effectively partitioning the lens aperture as it controls the transmission of light through the lens. Moving means 156 is used to move the aperture plate 150 to different positions to change the aperture sections. It is understood that the moving direction of the opening 152 is perpendicular to the longitudinal axis of the lenticules on the lenticular print material 90. Preferably, the opening 152 is adjusted by adjusting means 154 so that the width of the opening is substantially equal to 1/N of the lens aperture. It should be noted the width of the opening 152 can be smaller or greater than 1/N of the lens aperture and the shape of opening can be rectangular or elliptical or be changed in position to correct the vignetting of the lens. Numeral 100 denotes the photosensitive emulsion layer precoated on or attached to the backside of the lenticular print material 90.

Figure 4A:
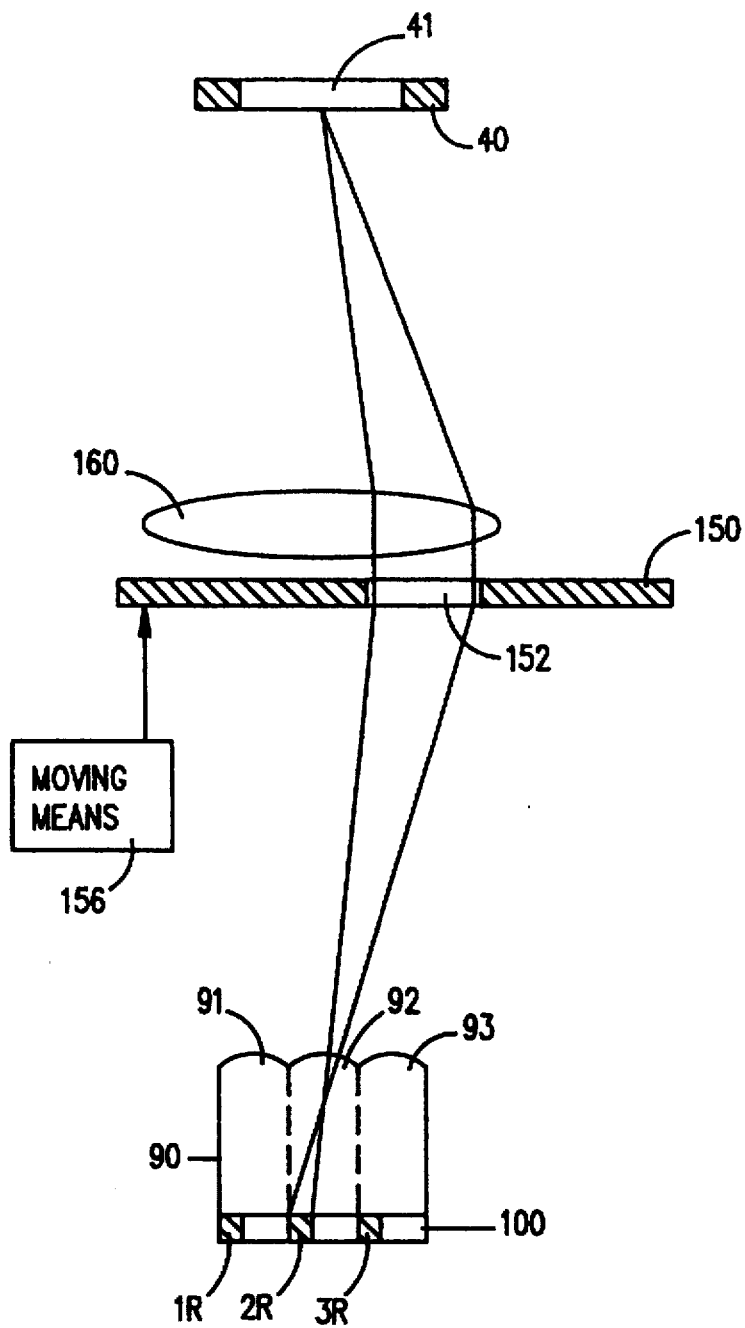
FIG. 4 illustrates how the projection angle is changed in a non-scanning printer.
Figure 4B:
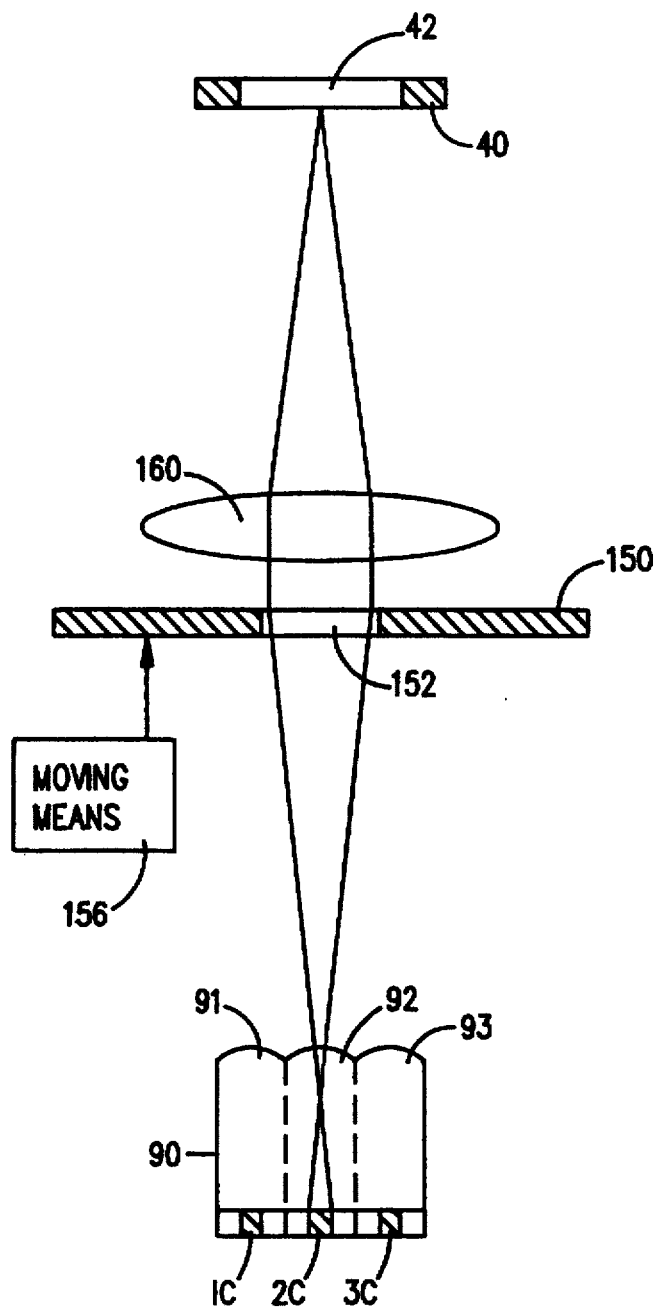
Figure 4C:
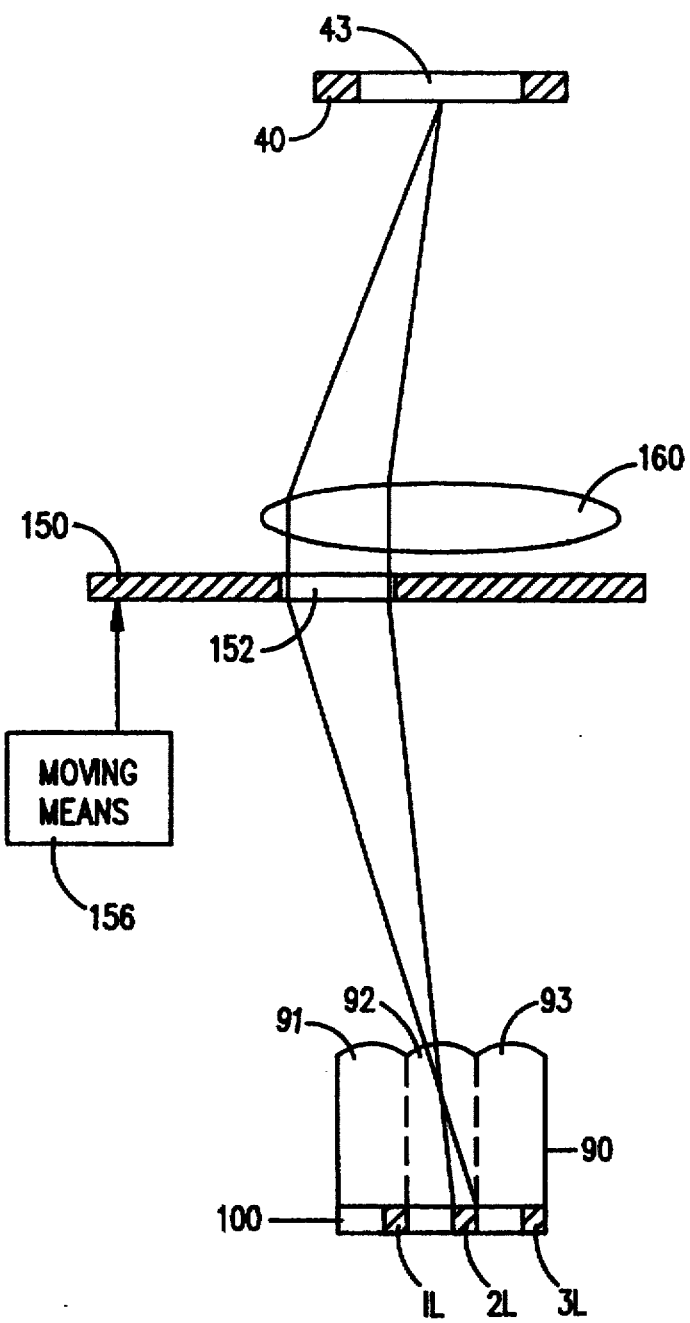

FIG. 4 illustrates how the projection angle is changed in a non-scanning printer. For illustrative purposes only, FIG. 4A to FIG. 4C illustrate a typical sequence used in exposing three 2D views 41, 42 and 43 to make a lenticular picture, and only three lenticules 91, 92, 93 of the lenticular print material 90 are used in the illustration. With N=3, the width of opening 152 of the aperture plate 150 is substantially equal to ⅓ the lens aperture. In FIG. 4A, the aperture plate 150 is located to the right of the projection lens 160 so that the 2D view 41 displayed on the LCD panel 40 is projected through the right section of the aperture of the projection lens 160, forming line-form images on the photosensitive emulsion layer 100 under the lenticules. The width of the line-form images 1R, 2R and 3R is substantially equal to ⅓ the width, W, of the lenticules 91, 92 and 93. In FIG. 4B, the aperture plate 150 is moved to the center of the projection lens 160 so that the 2D view 42 displayed on the LCD panel 40 is projected through the middle section of the aperture of the projection lens 160, forming line-form images 1C, 2C, 3C on the photosensitive emulsion layer 100. In FIG. 4C, the aperture plate 150 is moved to the left of the projection lens 160 so that the 2D view 43 displayed on the LCD panel 40 is projected through the left section of the aperture of the projection lens 160, forming line-form images 1L, 2L, 3L on the photosensitive emulsion layer 100.

The non-scanning printer can be used with other types of matrix displays. Among these are various light-valve panels, LED panels, and video monitors.

It should be noted that the 2D views that are used for exposing the lenticular print material can be of the same scene or of different scenes. Thus, the filmless method and printer for making 3D pictures, according to the present invention, can also be used for making animation pictures. Different scenes are printed for producing animation pictures.

While the present invention has been disclosed in reference to the preferred embodiments, it shall be understood by those skilled in the art that various changes, modifications and substitutions may be incorporated into such embodiments without departing from the spirit of the invention as defined by the claims appearing hereafter.

What is claimed is:

1. A filmless printing method for printing 3D and animation pictures on lenticular print material comprising a multiplicity of lenticules from a plurality of different 2D views of at least one scene, said method comprising the steps of:
    (a) sequentially displaying said 2D images of different 2D views of a scene on a matrix display; and
    (b) projecting said display 2D images onto lenticular print material through a projection lens at different projection angles which is focused on said matrix display and at desired locations on said print material so as to expose said 2D images onto the lenticular print material.

2. The method of claim 1 wherein said matrix display is a light-valve panel illuminated by a light source.

3. The method of claim 2 wherein said light-valve panel comprises an LCD panel.

4. The method of claim 2 wherein said light-valve panel comprises an LED panel.

5. The method of claim 1 further comprising the step of moving at least two of the group of elements comprising the matrix display, the projection lens and lenticular print material so as to expose said displayed 2D images onto said lenticular print material at the desired locations at different projection angles while maintaining said projection lens in proper focus on said screen and said lenticular print material.

6. The method of claim 1 further comprising the step of acquiring a plurality of 2D views of a scene for displaying on the matrix display by aiming an electronic camera at an object in a scene which it is desired to print into a picture, said aiming being performed to keep the object in proper registration for subsequent printing of the picture, said electronic camera acquiring 2D images of the scene at different viewing angles by the relative movement between the electronic camera and the object while the camera is being aimed at said object, said aiming and relative movement of said camera and object automatically maintaining the object in proper registration.

7. The method of claim 1 in which a plurality of 2D images of views of a scene from different viewing angles are stored in a computer as digital files, with each of said views having a key subject, said method further comprising the steps of first:
    (a) selecting the key subject image from matrix display of the first of said 2D images;
    (b) electronically obtaining the location of said selected key subject image of all of the stored 2D images of the scene;
    (c) electronically shifting each of said 2D images so that the key subject image of each of said 2D images coincides with said obtained location of said selected key subject image, and then sequentially displaying said 2D images on a matrix display in step a of claim 1 and projecting said displayed images in step b of claim 1.

8. The method of claim 1 wherein said projection lens is stationary and has a large aperture sufficient for filling the entire area of each of said lenticules with said images, with said lens aperture being partitioned into a plurality of horizontally-spaced sections; and controlling said aperture by selecting said aperture sections of said projection lens for transmitting light rays from said displayed 2D images of each different view, one at a time, through a different aperture section of said projection lens during printing.

9. The method of claim 8 wherein said matrix display is a light-valve panel illuminated by a light source.

10. The method of claim 8 wherein said light valve panel comprises an LCD panel.

11. The filmless printing method of claim 1 in which the plurality of 2D views of a scene at different viewing angles displayed in step (a) are generated in a computer with a selected object of said scene being kept in proper registration during the generation of the computer views which are electronically captured in the computer.

12. The method of claim 8 for printing 3D pictures from a plurality of electronically captured and computer generated 2D images of different scenes on lenticular print material having a multiplicity of lenticules, each lenticule having longitudinal axis and horizontal axis, said method comprising the steps of:

(a) electronically capturing the 2D images of some of said scenes by electronic capturing means;

(b) electronically generating the 2D images of other scenes by a computer;

(c) electronically combining said captured 2D images and said computer generated 2D images of said other scenes thereby producing a plurality of combined 2D images;

(d) conveying said combined 2D images by electronic conveying means to a video monitor with a screen for sequentially displaying said combined 2D images on said screen;

(e) projecting said displayed 2D images for exposing said 2D images onto lenticular print material through a projection lens which is focused on said screen and on said lenticular print material at the desired locations; and (f) moving the group of elements comprising (i) said projection lens and (ii) said lenticular print material in the same direction to different positions in relation to said screen of said video monitor for exposing said displayed 2D images onto said print material at the desired locations at different projection angles while maintaining said projection lens in proper focus on said screen and said lenticular print material, said moving direction being perpendicular to the longitudinal axis of the lenticules of said lenticular print material.

13. A filmless printer for printing 3D and animation pictures on lenticular printing material from a plurality of 2D images of at least one scene comprising:

(a) a matrix display for sequentially displaying said 2D images of different 2D views of a scene; and (b) a projection lens for projecting said displayed 2D images onto said lenticular print material at different projection angles, with the projection lens having the capability of being focused on the matrix display and at desired locations on said print material so as to expose said 2D images onto the lenticular print material.

14. The printer of claim 13 wherein said matrix display is a light-valve panel illuminated by a light source.

15. The printer of claim 14 wherein said light-valve panel comprises an LCD panel.

16. The printer of claim 14 wherein said light-valve panel comprises an LED panel.

17. The printer of claim 13 further comprising means for moving said projection lens and said print material in the same direction to different positions in relation to said matrix display so that the projection lens is projecting the image onto the print material at a desired location and projection angle.

18. The filmless printer of claim 13, said 3D printer further comprising:

(a) a computer with means for storing said 2D images;

(b) means in said computer for electronically determining the location of the key subject image in said stored 2D images;

(c) means in said computer for electronically shifting said stored 2D images; and (d) a video monitor.

19. The filmless printer of claim 13 wherein said projection lens is stationary and has a large aperture sufficient for filling the entire area of each of said lenticules with said images, with said lens aperture being partitioned into a plurality of horizontally spaced sections with the printer having means to control said aperture of said projection lens for transmitting light waves from displayed 2D images of each view through a different aperture section of said projection lens during printing.

20. The printer of claim 19 wherein the number of 2D images of 2D views of a scene is equal to N, wherein N is an integer ranging from 2 to 100, with the means to control said aperture consisting of an opaque plate having an opening with the width substantially equal to 1/N the width of the aperture of said projection lens; and with the printer having means for moving said plate along a direction to relocate the opening on said plate at different sections of said projection lens so as to allow each of said N 2D images to be projected through a different aperture section of said projection lens.

21. The printer of claim 13 further comprising at least one electronic camera capable of acquiring each of said 2D views of a single scene at a plurality of viewing angles with means for conveying the 2D images of 2D views acquired therewith to the matrix display, means for aiming and maintaining said electronic camera at a common point of said scene while capturing said images at different viewing angles in order to maintain said 2D images of different views in proper registration during printing.

22. The method of claim 7 wherein the location of the key subject image obtained in Step (b) is expressed in terms of pixels (x,y,); said printing method further comprising the steps of:

(a) electronically selecting a portion of said first 2D image bounded by pixels (x+a,y+b), (x−a,y+b), (x+a,y−b) and (x−a,y−b) as a template, wherein a and b each represents a number of pixels ranging from 5 to at least 100;

(b) electronically selecting a portion of a second stored 2D image bounded by pixels (x+c,y+d), (x−c,y+d), (x+c,y−d) and (x−c,y−d) as a search area wherein c and d each represents a number of pixels with (c−a) and (d−b) each ranging from 5 to at least 100;

(c) electronically moving said template within said search area in order to find a match in image based upon the computer calculating a series of correlation coefficients S(m,n) using the following formula:

$$S(m,n) = \sum_i \sum_j \{B1(i,j) - B2(i+m,j+n)\}^2$$

where $(x-a) \leq i \leq (x+a)$, $(y-b) \leq j \leq (y+b)$; $(a-c) \leq m \leq (c-a)$, and $(b-d) \leq n \leq (d-b)$.

wherein B1(p,q) is the pixel intensity of pixel (p,q) in said template, B2(r,s) is the pixel intensity of pixel (r,s) in said search areas (d) electronically sorting out S(u,v) which is the minimum value of S(m,n);

(e) electronically shifting said second 2D image in Step (c) of claim 7 by a distance (u,v); and (f) repeating Step (b) through Step (e), supra, for each of the other 2D images.

23. A filmless printing method for printing 3D pictures from a plurality of electronically captured and computer generated 2D images of different scenes on lenticular print material having a multiplicity of lenticules, each lenticule having longitudinal axis and horizontal axis, said method comprising the steps of:

(a) electronically capturing the 2D images of some of said scenes by electronic capturing means;

(b) electronically generating the 2D images of other scenes by a computer;

(c) electronically combining said captured 2D images and said computer generated 2D images of said other scenes thereby producing a plurality of combined 2D images;

(d) conveying said combined 2D images by electronic conveying means to a video monitor with a screen for sequentially displaying said combined 2D images on said screen;

(e) projecting said displayed 2D images for exposing said 2D images onto lenticular print material through a projection lens which is focused on said screen and on said lenticular print material at the desired locations; and (f) moving the group of elements comprising (i) said projection lens and (ii) said lenticular print material in the same direction to different positions in relation to said screen of said video monitor for exposing said displayed 2D images onto said print material at the desired locations at different projection angles while maintaining said projection lens in proper focus on said screen and said lenticular print material, said moving direction being perpendicular to the longitudinal axis of the lenticules of said lenticular print material.

* * * * *